(12) United States Patent
Saito et al.

(10) Patent No.: US 8,216,625 B2
(45) Date of Patent: Jul. 10, 2012

(54) ACIDIC EMULSIFIED MAYONNAISE-LIKE FOOD

(75) Inventors: Yasunobu Saito, Yokosuka (JP); Youji Harada, Yokosuka (JP); Kazuko Watanabe, Yokosuka (JP); Kaori Muroga, Yokosuka (JP)

(73) Assignee: The Nisshin Oillio Group, Ltd., Tokyo (JP)

( * ) Notice: Subject to any disclaimer, the term of this patent is extended or adjusted under 35 U.S.C. 154(b) by 0 days.

(21) Appl. No.: 13/135,174

(22) Filed: Jun. 28, 2011

(65) Prior Publication Data

US 2011/0274818 A1    Nov. 10, 2011

Related U.S. Application Data

(63) Continuation-in-part of application No. 10/534,950, filed as application No. PCT/JP2003/009597 on Jul. 29, 2003, now abandoned.

(30) Foreign Application Priority Data

Nov. 18, 2002  (JP) ................................. 2002-333092

(51) Int. Cl.
*A23D 7/005* (2006.01)
*A23L 1/24* (2006.01)

(52) U.S. Cl. ......... 426/602; 426/531; 426/601; 554/227

(58) Field of Classification Search .................. 426/602, 426/531, 601
See application file for complete search history.

(56) References Cited

U.S. PATENT DOCUMENTS

| 4,145,451 A | 3/1979 | Oles |
| 5,756,143 A | 5/1998 | Cain et al. |
| 2003/0203096 A1 | 10/2003 | Hamm et al. |

FOREIGN PATENT DOCUMENTS

| CN | 1043072 | 6/1990 |
| EP | 0 332 027 | 9/1989 |
| JP | 59-166059 | 9/1984 |
| JP | 62-003748 | 1/1987 |
| JP | 07-031414 | 2/1995 |
| JP | 2003-158998 | 6/2003 |
| WO | WO 90/05460 | 5/1990 |

OTHER PUBLICATIONS

Qiang, H. et al, "The Production of Starch modified by alkenyl succinic anhydrides and its use in food industry", Food and Grease, May 5, 2000, vol. 5, 2000, pp. 28-30.

Chen, X. et al., "Preparation of Starch Sodium Alkenyl Succinate", Journal of Wuxi University of Light Industry, vol. 19, No. 5, Sep. 2000, pp. 495-497.

*Primary Examiner* — Brent Ohern

(74) *Attorney, Agent, or Firm* — Holtz, Holtz, Goodman & Chick, PC

(57) ABSTRACT

An acidic emulsified mayonnaise-like food of the present invention contains an esterified compound composed of a starch and a hydrolysate thereof and an alkenylsuccinic acid, and a thickening polysaccharide, wherein the content of protein is 0% by mass.

8 Claims, No Drawings

US 8,216,625 B2

ACIDIC EMULSIFIED MAYONNAISE-LIKE FOOD

CLAIM TO PRIORITY

This application claims the benefit of our co-pending United States patent application entitled "ACID EMULSIFIED MAYONNAISE-LIKE FOOD" filed May 16, 2005 and assigned Ser. No. 10/534,950, which is incorporated by reference herein.

BACKGROUND OF THE DISCLOSURE

1. Field of the Invention

The present invention relates to an acidic emulsified mayonnaise-like food, and more specifically, an acidic emulsified mayonnaise-like food suppressed in flavor deterioration and viscosity reduction with time and improved in emulsion stability. Note that the term "acidic emulsified mayonnaise-like food" conceptually includes mayonnaise and a mayonnaise-type flavor seasoning. The term "mayonnaise" used herein is the one defined in the Japan Agricultural Standards. The term "mayonnaise-type flavor seasoning", although it is not defined in the Japanese Agricultural Standards, is a food product analogous to mayonnaise in respects of flavor, appearance, physical properties, and intended use. Both are classified as semi-solid dressing (viscosity: 30,000 millipascal-second or more at 20° C.) in the classification of dressing of the Japan Agricultural Standards.

2. Description of the Prior Art

An acidic emulsified mayonnaise-like food is used for various types of cooking including salad dishes and loved by a wide variety of people. In the majority of cases, the flavor of such an acidic emulsified mayonnaise-like food is primarily due to edible fat and oil, egg, and edible vinegar. An acidic emulsified mayonnaise-like food using soybean protein in place of egg is disclosed in Japanese Patent Laid-Open No. 55-39725, whereas an acidic emulsified mayonnaise-like food using fermented milk in place of egg is disclosed in Japanese Patent Laid-Open No. 59-166059.

On the other hand, needs for food containing no cholesterol have recently increased for the health reason, and thus, attempts to prepare a mayonnaise-like food by using soybean protein as an emulsifying agent in place of egg have been so far made.

However, the acidic emulsified mayonnaise-like foods obtained even by the methods for manufacturing a mayonnaise-like food disclosed in the aforementioned publications are not free from phenomena such as degradation in flavor and reduction in viscosity with time if stored for a long period, inviting a decrease in shape retaining ability. Due to these phenomena, the commercial value of the food decreases. Furthermore, in such an acidic emulsified mayonnaise-like food, the emulsion state thereof is sometimes destroyed by a temperature change in the ambient air, more specifically, due to excessive cooling caused by irregularity in temperature within a refrigerator. In this case, the food also loses much of its commercial value. An oily component is lower in a mayonnaise type flavor seasoning than mayonnaise. The content thus reduced is generally compensated by a starch or the like. In this way, consideration is taken to texture and shape retaining ability (e.g., Japanese Patent Laid-Open No. 7-31414). However, such a product is not satisfactory in terms of deterioration of flavor with time. Accordingly, it has been desired to develop an acidic emulsified mayonnaise-like food suppressed in flavor deterioration and viscosity reduction with time, and having good emulsion stability and shape retaining ability.

Thus, an object of the present invention is to provide an acidic emulsified mayonnaise-like food suppressed in flavor deterioration and viscosity reduction with time and having good emulsion stability and shape retaining ability.

SUMMARY OF THE INVENTION

The inventors of the present invention carried out an in-depth study. As a result, they found that the aforementioned object can be accomplished by adding a specific esterified compound and a thickening polysaccharide and controlling the content of a protein to fall within a specific range.

The present invention has been accomplished based on the aforementioned finding. According to the present invention, there is provided An acidic emulsified mayonnaise-like food comprising, a) an esterified compound composed of a potato starch or a hydrolysate thereof and an alkenylsuccinic acid;

b) an esterified compound composed waxy cornstarch or a hydrolysate thereof and alkenylsuccinic acid;

c) thickening polysaccharide;

d) an edible fat oil;

e) wherein the content of protein is substantially 0%; and wherein f) the content of the esterified compounds is 1.0 to 2.5% by mass; and wherein g) the content of the thickening polysaccharide is 0.3 to 0.7% by mass; and wherein h) the content of the edible fat and oil is 50 to 70% by mass; and i) wherein the acid emulsified mayonnaise-like food is a semi-solid with a viscosity of 160,000 to 400,000 millipascal-second at 20 degrees Celsius.

Because of such a constitution, it is possible to obtain an acidic emulsified mayonnaise-like food suppressed in flavor deterioration and viscosity reduction with time and having good emulsion stability even if temperature of the ambient air changes, thereby maintaining good shape retaining ability, and satisfactory texture due to good oral solubility.

The viscosity at 20° C. of the acidic emulsified mayonnaise-like food of the present invention may be preferably 160,000 to 340,000 millipascal-second.

An acidic emulsified mayonnaise-like food of the present invention may further contain edible vinegar, salt and seasoning.

The mass ratio (ratio of an esterified compound to a thickening polysaccharide in terms of mass) is preferably from 2:1 to 10:1.

The degree of substitution of ester groups of the esterified compound is preferably 0.005 to 0.020.

The alkenylsuccinic acid is preferably octenylsuccinic acid.

The thickening polysaccharide is preferable xanthum gum.

DETAILED DESCRIPTION

An acidic emulsified mayonnaise-like food of the present invention will be explained below.

In this specification, the term "mayonnaise-like food" means semi-solid dressing defined in accordance with the Japan Agricultural Standards and having a viscosity of 30,000 millipascal-second or more at 20° C. As described above, the mayonnaise-like food is a concept including mayonnaise and mayonnaise-type seasoning, and specific examples thereof include mayonnaise, salad dressing, tartar sauce, and other semi-solid dressing.

An acidic emulsified mayonnaise-like food of the present invention comprises a) an esterified compound composed of a potato starch or a hydrolysate thereof and an alkenylsuccinic acid;

b) an esterified compound composed waxy cornstarch or a hydrolysate thereof and alkenylsuccinic acid;

c) thickening polysaccharide;

d) an edible fat oil;

e) wherein the content of protein is substantially 0%; and wherein f) the content of the esterified compounds is 1.0 to 2.5% by mass; and wherein g) the content of the thickening polysaccharide is 0.3 to 0.7% by mass; and wherein h) the content of the edible fat and oil is 50 to 70% by mass; and i) wherein the acid emulsified mayonnaise-like food is a semi-solid with a viscosity of 160,000 to 400,000 millipascal-second at 20 degrees Celsius.

As an example of such a starch, there can be mentioned potato starch, tapioca starch, cornstarch, waxy cornstarch, and the like. In the acidic emulsified mayonnaise-like food of the present invention, hydrolysates of the aforementioned starches may be used. The hydrolysates of the aforementioned starches may be obtained by any method, for example, a conventional method. Of the starches, potato starch is preferably used. More preferably, potato starch may be used in combination with waxy cornstarch. When potato starch is used, an acidic emulsified mayonnaise-like food improved in flavor and texture (oral solubility) can be obtained. When potato starch is used in combination with waxy cornstarch, an acidic emulsified mayonnaise-like food improved in flavor and texture (oral solubility) can be obtained, and simultaneously, the smooth appearance of the acidic emulsified mayonnaise-like food immediately after manufacturing can be maintained for a long period. Note that the "smooth appearance" refers to an appearance of glazy, glossy and smooth state of the surface of an acidic emulsified mayonnaise-like food pushed out from a plastic squeeze bottle.

The esterified compound is obtained by esterifying a starch or a hydrolysate thereof with alkenylsuccinic acid. Such esterified compounds may be used singly or in an admixture of two or more types. As the esterified compound, it is preferable to use an esterified compound composed of potato starch or a hydrolysate thereof and an alkenylsuccinic acid. It is more preferable to use an esterified compound composed of potato starch or a hydrolysate thereof and an alkenylsuccinic acid in combination with an esterified compound composed of waxy cornstarch or a hydrolysate thereof and an alkenylsuccinic acid. A degree of substitution of ester groups of the esterified compound is preferably 0.005 to 0.020. When a degree of substitution is less than 0.005, emulsifiability is low, with the result that emulsification stability of the resultant mayonnaise-like food may decrease. On the other hand, when a degree of substitution exceeds 0.020, it is not suitable for use under the restriction (FAO/WHO Joint Expert Committee on Food Additives (JECFA).

The term "degree of substitution" of an ester group refers the number of substituents (ester groups of an alkenylsuccinic acid) bound via an ester bond to a single glucose molecule, which is a constitution unit of a starch. For example, when a degree of substitution of ester groups of an esterified compound of a starch with octenylsuccinic acid is 0.015, 0.015 of substituents (ester groups of octenylsuccinic acid) are bound to a single glucose molecule of a starch via an ester bond. Degree of substitution of ester groups of an esterified compound of a starch or a hydrolysate thereof with an alkenylsuccinic acid can be measured by the Smith method (1967) based on the saponification method (Genung & Mallatt, 1941). This method is performed by adding strong alkali to an esterified compound to generate an alkenylsuccinate and quantifying the amount of alkali consumed there. As an example of the aforementioned alkenylsuccinic acid, there can be mentioned octenylsuccinic acid, decenyl succinic acid, dodecenyl succinic acid, tetradecenyl succinic acid, hexadecenyl succinic acid, octadecenyl succinic acid, and the like.

An esterified compound composed of a starch or hydrolysate thereof and an alkenylsuccinic acid can be prepared by any method, for example, by a method, which comprises blending a starch or a hydrolysate thereof and an alkenylsuccinic acid and carrying out an esterification reaction in the presence of an acidic or alkaline catalyst, under an inert gas atmosphere as needed, at a temperature from room temperature to 200° C. for 5 to 20 hours. The obtained esterified compound may be subjected to a purification treatment for removing acid, color, and odor as needed. The esterified compound thus obtained generally has two carboxyl groups: one is a carboxyl group forming an ester with a starch or a hydrolysate thereof and the other carboxyl group may be free or form a salt with sodium, potassium, ammonia and an amine.

An esterified compound preferably used in an acidic emulsified mayonnaise-like food of the present invention is the esterified compound of potato starch and octenylsuccinic acid in view of flavor and texture (oral solubility). To improve flavor and texture (oral solubility), and to maintain smooth appearance for a long period, it is more preferable to use the esterified compound of potato starch and octenylsuccinic acid in combination with an esterified compound of waxy cornstarch and octenylsuccinic acid.

Furthermore, for the reasons mentioned above, a degree of substitution of ester groups of the esterified compound of potato starch and octenylsuccinic acid or the esterified compound of waxy cornstarch and octenylsuccinic acid is preferably 0.005 to 0.020. As the esterified compound of potato starch and octenylsuccinic acid, a commercially available one may be used, for example, Trecomextwalb 02 (a degree of substitution of ester groups is 0.015 and obtained from potato starch as a raw material) manufactured by Oji Cornstarch Co., Ltd. may be used. Furthermore, as the esterified compound of waxy cornstarch and octenylsuccinic acid, a commercially available one may be used, for example, N cleamer 46 (a degree of substitution of ester groups is 0.020 and obtained from waxy cornstarch as a raw material) manufactured by Japan NSC may be used.

The content of such an esterified compound in the acidic emulsified mayonnaise-like food of the present invention is preferably 0.1 to 5.0% by mass, more preferably 1.0 to 2.5% by mass, more preferably 1.2 to 2.5% by mass, and most preferably 1.2 to 2.2% by mass. When the content of an esterified compound is less than 0.1% by mass, sufficient stability cannot be obtained; whereas the content is not less than 5.0% by mass, the texture (oral solubility) of the resultant acidic emulsified mayonnaise-like food may not be good.

When an esterified compound of potato starch and octenylsuccinic acid is used in combination with an esterified compound of waxy cornstarch and succinic acid, the mass ratio of the esterified compound of potato starch and octenylsuccinic acid relative to the esterified compound of waxy cornstarch and succinic acid is preferably from 3:1 to 1:3, more preferably, from 2:1 to 1:2. If the mass ratio falls within the aforementioned range, the balance between flavor and texture (oral solubility) and long-term smooth appearance retaining ability improves.

As an example of the thickening polysaccharide to be used in an acidic emulsified mayonnaise-like food of the present invention, there can be mentioned carrageenan, locust bean, pectin, tamarind seed, guar gum, tragacanth gum, caprobean gum, gellan gum, xanthan gum, and the like. Of these polysaccharides for thickening, xanthan gum is preferably used in view of shape retaining ability, stable viscosity, and oral solubility. The polysaccharides for thickening may be used singly or in an admixture of two or more types. As the polysaccharides for thickening, commercially available ones may be used, for example, Eco gum GM manufactured by Dainippon Pharmaceutical Co., Ltd. may be used.

The content of a thickening polysaccharide in an acidic emulsified mayonnaise-like food of the present invention is preferably 0.01 to 2.5% by mass, more preferably 0.3 to 0.7% by mass, and most preferably, 0.4 to 0.6% by mass. When the content of a thickening polysaccharide is less than 0.01% by mass, the viscosity is so low that a mayonnaise-like viscosity may not be obtained. On the other hand, when the content is not less than 25% by mass, the viscosity of the resultant acidic emulsified mayonnaise-like food is so high that oral solubility deteriorates and suitability for cooking decreases.

Although preferable contents of an esterified compound and a thickening polysaccharide in an acidic emulsified mayonnaise-like food of the present invention are as mentioned above, the mass ratio (ratio of an esterified compound to a thickening polysaccharide in terms of mass) is preferably from 2:1 to 10:1. When the mass ratio of an esterified compound to a thickening polysaccharide falls within the aforementioned range, the resultant acidic emulsified mayonnaise-like food has a good balance between the oral solubility and the shape retaining ability. Furthermore, the mass ratio of an esterified compound to a thickening polysaccharide is more preferably from 2:1 to 5:1, and most preferably, from 2.5:1 to 4.5:1.

An acidic emulsified mayonnaise-like food of the present invention may contain edible fat and oil, edible vinegar, salt and seasoning.

As an example of such an edible fat and oil, there can be mentioned soybean oil, rapeseed oil, high oleic rapeseed oil, corn oil, sesame seed oil, sesame salad oil, Japanese basil oil, linseed oil, peanut oil, safflower oil, high oleic safflower oil, sunflower oil, high oleic sunflower oil, cotton seed oil, grape seed oil, macadamia nut oil, hazelnut oil, pumpkin seed oil, walnut oil, camellia oil, tea oil, perilla oil, borage oil, olive oil, rice bran oil, wheat germ oil, palm oil, palm kernel oil, coconut oil, cacao butter, beef fat, lard, chicken fat, milk fat, fish oil, seal oil, algae oil, low saturated fats and oils improved from these, transesterification fats and oils obtained by exchanging ester groups between two or more types of these oils, hydrogenated fats and oils, and fractionated fats and oils of these. These edible fats and oils may be used singly or in an admixture of two or more types.

The content of such an edible fat and oil in the acidic emulsified mayonnaise-like food of the present invention is preferably 10 to 80% by mass, more preferably 50 to 75% by mass, and most preferably 50 to 65% by mass.

As an example of the edible vinegar, there can be mentioned cereal vinegar, fruit vinegar, rice vinegar, apple vinegar, grape vinegar and the like. These vinegars may be used singly or in an admixture of two or more types. The content of vinegar in an acidic emulsified mayonnaise-like food of the present invention may vary depending upon the acidity of the vinegar in terms of acetic acid and preferably fall within the range of 0.3 to 1.5% by mass of the total mass of the acidic emulsified mayonnaise-like food.

As an example of the salt, there can be mentioned refined salt, crude salt, solar salt, rock salt, mineral salt, potassium salt, and the like. These salts may be used singly or in an admixture of two or more types. The content of salt in an acidic emulsified mayonnaise-like food of the present invention is preferably 0.5 to 4.0% by mass.

As an example of the seasoning, there can be mentioned seasonings such as consommé, soy sauce, ketchup, toubanjyan (spicy bean paste), amino acids, tenmenjyan (Chinese sweet seasoning), fermented seasoning, acidulant, tasty seasoning (amino acids, nucleic acids, sodium glutamate), flavoring seasoning, and the like. The content of such a seasoning in an acidic emulsified mayonnaise-like food of the present invention may be one generally used in an acidic emulsified mayonnaise-like food.

The acidic emulsified mayonnaise-like food of the present invention has a viscosity of 30,000 millipascal-second or more, preferably 160,000 to 400,000 millipascal-second, more preferably 160,000 to 340,000 millipascal-second, and most preferably 180,000 to 300,000 millipascal-second at 20° C. That is, the present invention relates to an acidic emulsified mayonnaise-like food that can be inhibited from deterioration in flavor and a reduction in viscosity, which occur with the passage of time, and has a stable emulsifying property and a good shape retaining ability, in the so-called semi-solid dressing defined in the Japan Agricultural Standards. The viscosity can be adjusted to the above-mentioned range by a common method for producing semi-solid dressing such as mayonnaise, and a specific method thereof will be described below.

An acidic emulsified mayonnaise-like food of the present invention may contain raw materials usually used in an acidic emulsified mayonnaise-like food such as mayonnaise. As an example of such a raw material, there can be mentioned saccharides such as sweeteners, hydrogenated starch syrup, and white superior soft sugar; herbs and spices such as pepper, paprika, basil, dill, rosemary, cumin, tarragon, coriander, star anise, clove, cardamom, laurel, turmeric, fennel, mustard, thyme, sage, mace, all spice, celery seed, Japanese pepper, Japanese horseradish, capsicum, oregano, cayenne pepper, chili powder, and caper; cereals such as corn and pasta; nuts and seeds such as walnut, sesame seed, pine nut, and almond nut; beans such as Japanese fermented soybean paste, fermented soybeans, and soybean milk; sea food such as tuna, common scallop, dried bonito, sea urchin and salted cod roe; poultry, and whale meats such as bacon, canned beef, ham, and minced pork, beef and chicken; milks such as yogurt, cheese, caw milk, and cream, vegetables such as chive, pumpkin, Japanese basil, ginger, celery, Japanese radish, bamboo shoot, onion, tomato (including processed tomato), carrot, garlic, green onion, parsley, bell pepper, red bell pepper, yellow bell pepper, pickles, zarsai (Chinese pickles), horseradish, Zingiber mioga, scallion, green peace, and Japanese basil seed; seeds and juice of fruits such as pickled Japanese plum, Japanese plum, citrus kabosu, olive, grapefruit, citrus sudachi, pineapple, grape, mango, peach, citrus junos, lime, apple, lemon, orange, kiwi, Citrus natsudaidai, hassaku orange, and passion fruit; mushrooms such as shiitake mushroom, mushroom, and wood ear; algae such as kelp, layer, hijiki, Tosaka layer, and seeweed, beverages such as refined sake, wine, sweet cooking rice wine, seaweed drink, plum wine; sauces such as chili sauce, tomato sauce, oyster sauce, and Worcester sauce; extracts such as natural extract, yeast extract, meat extract, sea food extract, and vegetable extract; protein hydrolysates; flavors; and water. These raw materials may be added appropriately depending upon desired flavor; however, care must be taken to the content of protein.

In an acidic emulsified mayonnaise-like food of the present invention, the content of protein is substantially zero. When the protein content is substantially zero, the flavor and viscosity of the acidic emulsified mayonnaise-like food with time may decrease.

To control the protein content of an acidic emulsified mayonnaise-like food to fall within the aforementioned range, the mayonnaise-like food may be manufactured by using no egg and soybean protein, although they are usually used as raw materials.

The content of protein in an acidic emulsified mayonnaise-like food may be measured by any means, for example, by the Kjeldahl method. Even though the content of protein is not measured by an analytical method, it may be obtained through calculation based on the contents of raw materials of an acidic emulsified mayonnaise-like food. The Kjeldahl method is one that can obtain the amount of protein based on the nitrogen content of a sample. When amino acids and nucleic acids such as glutamic acid, inosinic acid, and guanylic acid are contained in an acidic emulsified mayonnaise-like food, the content of protein in a sample is obtained by subtracting the contents of these amino acids and nucleic acids.

The amount of amino acids and nucleic acids to be subtracted may be the amounts of them added during manufacturing of an acidic emulsified mayonnaise-like food or the amounts of them actually contained in the acidic emulsified mayonnaise-like food obtained by a quantification means. In practical analysis, nucleic acids such as inosinic acid and guanylic acid can be quantified by high-performance liquid chromatography and amino acid such as glutamic acid can be quantified by liquid chromatography. The amount of amino acids can be obtained by, for example, the "amino acid automatic analyzer" manufactured by JEOL. Ltd.

The acidic emulsified mayonnaise-like food of the present invention can be manufactured by a conventional method for manufacturing a mayonnaise-like food. Now, a method of manufacturing an acidic emulsified mayonnaise-like food of the present invention will be described below by way of an example, however, the method of manufacturing an acidic emulsified mayonnaise-like food of the present invention will not be limited by this example.

A method of manufacturing an acidic emulsified mayonnaise-like food of the present invention comprises a step of emulsifying an aqueous phase portion, which contains an esterified compound composed of a starch or a hydrolysate thereof and an alkenylsuccinic acid, a thickening polysaccharide, and substantially no protein, with an oily phase portion. According to the method of manufacturing an acidic emulsified mayonnaise-like food of the present invention, since an aqueous phase portion containing no protein is used as a raw material, the protein content of the resultant acidic emulsified mayonnaise-like food is less than 0.5% by mass. Now, a specific example of manufacturing an acidic emulsified mayonnaise-like food of the present invention will be described.

To manufacture such an acidic emulsified mayonnaise-like food of the present invention, first an aqueous phase portion is prepared by placing individual raw materials except edible fat and oil in a heatable stirring vessel and blending these materials by stirring them while heating the stirring vessel. The stirring may be performed while heating if necessarily for dispersing, dissolving and sterilizing the raw materials. As long as these purposes can be attained, the conditions are not particularly limited. The stirring can be performed while heating under pressure, reduced pressure and normal pressure and generally performed under normal pressure. The heating temperature is not particularly limited as long as raw materials can be dissolved and sterilized and usually performed at a temperature of 40 to 95° C., preferably 60 to 95° C. Heating may not be performed if unnecessary.

Stirring may be performed under conditions as long as raw materials are dissolved under the condition. As a stirring means or method, use may be made of a propeller, homo mixer, blender, dispersion mill, paddle mixer, colloidal mill, continuous mixer, statistic mixer and ultrasonic wave. The rotation number and stirring time may not be particularly limited as long as raw materials can be uniformly dispersed. When heated, the aqueous phase portion is thereafter cooled to about normal temperature and combined with an edible fat and oil as an oily phase, thereby emulsifying them. The emulsification is generally performed under reduced pressure by use of a propeller, homo mixer, blender, dispersion mill, paddle mixer, colloidal mill, continuous mixer, or a statistic mixer. In this manner, the acidic emulsified mayonnaise-like food can be obtained.

EXAMPLES

The present invention will now be described in more detail by way of Examples, which should not be construed as limiting the scope of the present invention.

In Examples, an acidic emulsified mayonnaise-like food was evaluated by the following method.

[Evaluation Method for Acidic Emulsified Mayonnaise-Like Food]

(1) Measurement of Viscosity

A sample stored at a temperature of 20° C. is rotated twice at 2 rpm by a rotor No. 6, and then the viscosity of the sample is measured by a BH-type viscometer three times. An average value is used as a value of viscosity.

Note that the viscosity of an acidic emulsified mayonnaise-like food was measured immediately after manufacturing and after storing at 20° C. under 1000 1× for 1, 2, 3, 4, 5, and 7 weeks.

(2) Evaluation of Flavor

Dishes having lettuce appropriately delivered and dressed with an acidic emulsified mayonnaise-like food were served to a panel of four specialists. They ate the lettuce with the acidic emulsified mayonnaise-like food and evaluated the acidic emulsified mayonnaise food for flavor in accordance with the following evaluation criteria. Note that the obtained acidic emulsified mayonnaise-like food was evaluated for flavor immediately after manufacturing and after storing in a dark place at 40° C. and 20° C. under 1000 1× for 1, 2, 3, 4, 5, and 7 weeks. Evaluation was performed by setting the flavor immediately after manufacturing at 5 points and by the average of scores of the four specialists of the panel.

5 points: Flavor is fresh and favorable comparable to that immediately after manufacturing.

4 points: Flavor slightly changes compared to that immediately after manufacturing but is still favorable.

3 points: Flavor slightly deteriorates compared to that immediately after manufacturing but is still acceptable.

2 points: Flavor deteriorates compared to that immediately after manufacturing and is bad.

1 point: Flavor significantly deteriorates compared to that immediately after manufacturing and is bad.

(3) Repeated Refrigeration-Thaw Test

An acidic emulsified mayonnaise is stored at −10° C. for 8 hours and thereafter stored at 20° C. for 16 hours. This cycle was repeated 15 times and thereafter the appearance was checked and the viscosity thereof was measured. Viscosity was measured in the same manner as described in the paragraph (1).

(4) Evaluation of Shape Retaining Ability

A plastic squeeze bottle having a star-shape opening was charged with an acidic emulsified pushed out from the plastic squeeze bottle, the shape of the mayonnaise-like food was evaluated by visual observation based on the following evaluation criteria.

G: Sharp star-shape stripe is observed.
M: Star-shape stripe is observed but somewhat unclear.
P: No star-shape is observed.

(5) Evaluation of Oral Solubility

A panel of four specialists ate an acidic emulsified mayonnaise-like food and evaluated it for oral solubility. Evaluation was made based on an average of four specialists.

G: The food melts fast in the mouth and texture is good.
M: The food melts slowly in the mouth.
P: The food is difficult to melt in the mouth.

(6) Evaluation of Smooth Appearance Retaining Ability

A so-called mayonnaise plastic squeeze bottle is charged with an acidic emulsified mayonnaise-like food and stored at a temperature of 5° C. for a predetermined period. Thereafter, the mayonnaise-like food is pushed out from the plastic squeeze bottle and surface state thereof is visually observed.

E: Best condition where smooth appearance is retained.
G: Good condition where smooth appearance is slightly lost.
P: Not good condition where smooth appearance is lost.

Example 1

The acidic emulsified mayonnaise-like food was manufactured using the raw materials in accordance with the formulation shown in Table 1.

The acidic emulsified mayonnaise-like food was manufactured as follows.

The raw materials for an aqueous phase portion were placed in accordance with the formulation shown in Table 1 in a heatable container with a stirrer and stirred by means of a paddle mixer at 100 rpm at room temperature for 10 minutes. Subsequently, rapeseed serving as an oil phase was added and emulsified by rotating the paddle mixer at 100 rpm and a homo mixer at 5,500 rpm under reduced pressure for 10 minutes to obtain an acidic emulsified mayonnaise-like food of starch emulsified mayonnaise-type. The viscosity of the obtained acidic emulsified mayonnaise-like food immediately after manufacturing was 198,800 mPa·s. The protein content of the obtained acidic emulsified mayonnaise-like food was obtained by subtracting the amount of sodium glutamate added as a flavor seasoning from an analytical value of the Kjeldahl method. As a result, the protein content was 0% by mass. The obtained acidic emulsified mayonnaise-like food was evaluated by the method described in the paragraph [evaluation method for acidic emulsified mayonnaise-like food]. The results are shown in Table 8 (Test (1) and (2)), Table 9 (test (3)), Table (test (4) and (5)), and Table 11 (test (6)).

TABLE 1

| | Name of raw material | Content (% by mass) |
|---|---|---|
| Oil phase | Rapeseed (The Nisshin OilliO Group, Ltd.) | 57.0 |
| Aqueous phase | Edible vinegar | 7.0 |
| | Spice | 0.1 |
| | Salt | 2.6 |
| | Esterified starch with octenylsuccinic acid | 1.5 |
| | Hydrogenated starch syrup | 6.0 |
| | Vegetable extract | 0.4 |
| | Xanthan gum | 0.5 |
| | Sodium glutamate | 0.4 |
| | Concentrated fruit juice | 0.5 |
| | Yeast extract | 0.1 |
| | Water | 23.9 |
| | Total | 100.0 |

In Table 1, as the esterified starch with octenylsuccinic acid, Trecomextwalb 02 (trade name) manufactured by Oji Cornstarch Co., Ltd. (degree of substitution of ester groups is 0.015 and obtained from potato starch as a raw material) was used. As the hydrogenated starch syrup, SE600 (trade name) manufactured by Nikken Chemicals Co., Ltd. was used. As the xanthan gum, Eco gum GM (trade name) manufactured by Dainippon Pharmaceutical Co., Ltd. was used.

Example 2

An acidic emulsified mayonnaise-like food of starch emulsified mayonnaise type was obtained in the same manner as in Example 1 except that the raw materials were used in accordance with the formulation shown in Table 2. The viscosity of the obtained acidic emulsified mayonnaise-like food immediately after manufacturing was 163,000 mPa·s. The protein content of the obtained acidic emulsified mayonnaise-like food, which was calculated from the contents of the raw materials, was 0% by mass. The obtained acidic emulsified mayonnaise-like food was evaluated by the method described in the paragraph [evaluation method for acidic emulsified mayonnaise-like food]. The results are shown in Table 8 (Test (1) and (2)), Table 9 (test (3)), Table 10 (test (4) and (5)), and Table 11 (test (6)).

TABLE 2

| | Name of raw material | Content (% by mass) |
|---|---|---|
| Oil phase | Rapeseed (The Nisshin OilliO Group, Ltd.) | 57.0 |
| Aqueous phase | Edible vinegar | 7.0 |
| | Spice | 0.1 |
| | Salt | 2.6 |
| | Esterified starch 1 with octenylsuccinic acid | 0.7 |
| | Esterified starch 2 with octenylsuccinic acid | 0.7 |
| | Hydrogenated starch syrup | 6.0 |
| | Vegetable extract | 0.4 |
| | Xanthan gum | 0.5 |
| | Sodium glutamate | 0.4 |
| | Concentrated fruit juice | 0.5 |
| | Yeast extract | 0.1 |
| | Water | 24.0 |
| | Total | 100.0 |

In Table 2, as the esterified starch 1 with octenylsuccinic acid, Trecomextwalb 02 (trade name) manufactured by Oji Cornstarch Co., Ltd. (degree of substitution of ester groups is 0.015 and obtained from potato starch as a raw material) was used. As the esterified starch 2 with octenylsuccinic acid, N cleamer 46 (trade name) manufactured by Japan NSC (degree of substitution of ester groups is 0.020 and obtained from waxy cornstarch as a raw material) may be used. As the hydrogenated starch syrup, SE600 (trade name) manufactured by Nikken Chemicals Co., Ltd. was used. As the xanthan gum, Eco gum GM (trade name) manufactured by Dainippon Pharmaceutical Co., Ltd. was used.

Comparative Example 1

An acidic emulsified mayonnaise-like food of egg emulsified mayonnaise type was obtained in the same manner as in Example 1 except that the raw materials were used in accordance with the formulation shown in Table 3. The viscosity of the obtained acidic emulsified mayonnaise-like food immediately after manufacturing was 198,000 mPa·s. The protein content of the obtained acidic emulsified mayonnaise-like food, which was calculated from the contents of the raw materials, was 2.48% by mass. The obtained acidic emulsified mayonnaise-like food was evaluated by the method described in the paragraph [evaluation method for acidic emulsified mayonnaise-like food]. The results are shown in Table 8 (Test (1) and (2)), Table 9 (test (3)), and Table 10 (test (4) and (5)).

TABLE 3

| | Name of raw material | Content (% by mass) |
|---|---|---|
| Oil phase | Rapeseed (The Nisshin OilliO Group, Ltd.) | 68.0 |
| Aqueous phase | Yolk containing 10% salt | 16.7 |
| | Edible vinegar | 5.5 |
| | Salt | 0.3 |
| | Sodium glutamate | 0.3 |
| | Spice | 0.1 |
| | Water | 9.1 |
| | Total | 100.0 |

In Table 3, as the yolk containing 10% salt, one manufactured by Taiyo Kagaku Co., Ltd. was used.

Comparative Example 2

An acidic emulsified mayonnaise-like food of soybean protein emulsified mayonnaise type was obtained in the same manner as in Example 1 except that the raw materials were used in accordance with the formulation shown in Table 4. The viscosity of the obtained acidic emulsified mayonnaise-like food immediately after manufacturing was 188,000 mPa·s. The protein content of the obtained acidic emulsified mayonnaise-like food, which was calculated from the contents of the raw materials, was 1.47% by mass. The obtained acidic emulsified mayonnaise-like food was evaluated by the method described in the paragraph [evaluation method for acidic emulsified mayonnaise-like food]. The results are shown in Table 8 (Test (1) and (2)), Table 9 (test (3)), and Table 10 (test (4) and (5)).

TABLE 4

| | Name of raw material | Content (% by mass) |
|---|---|---|
| Oil phase | Rapeseed (The Nisshin OilliO Group, Ltd.) | 55.0 |
| Aqueous phase | Edible vinegar | 7.5 |
| | Salt | 2.6 |
| | Soybean protein | 2.2 |
| | Hydrogenated starch syrup | 5.0 |
| | Vegetable extract | 1.2 |
| | White superior soft sugar | 1.0 |
| | Xanthan gum | 0.5 |
| | Spice | 0.3 |
| | Sodium glutamate | 0.4 |
| | Yeast extract | 0.1 |
| | Water | 24.2 |
| | Total | 100.0 |

In Table 4, as the soybean protein, Sorpie 1500 (trade name) manufactured Nisshin Cosmo Food Co., Ltd. was used. As the hydrogenated starch syrup, HS300 (trade name) manufactured by Hayashibara Co., Ltd. was used. As the xanthan gum, Eco gum GM (trade name) manufactured by Dainippon Pharmaceutical Co., Ltd. was used.

Comparative Example 3

An acidic emulsified mayonnaise-like food of starch+egg emulsified mayonnaise type was obtained in the same manner as in Example 1 except that the raw materials were used in accordance with the formulation shown in Table 5. The viscosity of the obtained acidic emulsified mayonnaise-like food immediately after manufacturing was 215,000 mPa·s. The protein content of the obtained acidic emulsified mayonnaise-like food, which was calculated from the contents of the raw materials, was 0.74% by mass. The obtained acidic emulsified mayonnaise-like food was evaluated by the method described in the paragraph [evaluation method for acidic emulsified mayonnaise-like food]. The results are shown in Table 8 (Test (1) and (2)), Table 9 (test (3)), and Table 10 (test (4) and (5)).

TABLE 5

| | Name of raw material | Content (% by mass) |
|---|---|---|
| Oil phase | Rapeseed (The Nisshin OilliO Group, Ltd.) | 57.0 |
| Aqueous phase | Edible vinegar | 7.0 |
| | Spice | 0.1 |
| | Salt | 2.0 |
| | Esterified starch with octenylsuccinic acid | 1.0 |
| | Yolk containing 10% salt | 5.0 |
| | Hydrogenated starch syrup | 6.0 |
| | Vegetable extract | 0.4 |
| | Xanthan gum | 0.5 |
| | Sodium glutamate | 0.4 |
| | Concentrated fruit juice | 0.5 |
| | Yeast extract | 0.1 |
| | Water | 20.0 |
| | Total | 100.0 |

In Table 5, as the esterified starch with octenylsuccinic acid, Trecomextwalb 02 (trade name) manufactured by Oji Cornstarch Co., Ltd. (degree of substitution of ester groups is 0.015 and obtained from potato starch as a raw material) was used. As the yolk containing 10% salt, one manufactured by Taiyo Chemical Co., Ltd. was used. As the hydrogenated starch syrup, SE600 (trade name) manufactured by Nikken Chemicals Co., Ltd. was used. As the xanthan gum, Eco gum GM (trade name) manufactured by Dainippon Pharmaceutical Co., Ltd. was used.

Comparative Example 4

An acidic emulsified mayonnaise-like food of starch+soybean protein emulsified mayonnaise type was obtained in the same manner as in Example 1 except that the raw materials were used in accordance with the formulation shown in Table 6. The viscosity of the obtained acidic emulsified mayonnaise-like food immediately after manufacturing was 200,000 mPa·s. The protein content of the obtained mayonnaise-like food, which was calculated from the contents of the raw materials, was 0.54% by mass. The obtained acidic emulsified mayonnaise-like food was evaluated by the method described in the paragraph [evaluation method for acidic emulsified mayonnaise-like food]. The results are shown in Table 8 (Test (1) and (2)), Table 9 (test (3)), and Table 10 (test (4) and (5)).

TABLE 6

| | Name of raw material | Content (% by mass) |
|---|---|---|
| Oil phase | Rapeseed (The Nisshin OilliO Group, Ltd.) | 57.0 |
| Aqueous phase | Edible vinegar | 7.0 |
| | Spice | 0.1 |
| | Salt | 2.6 |
| | Esterified starch with octenylsuccinic acid | 1.0 |
| | Soybean protein | 0.8 |
| | Hydrogenated starch syrup | 6.0 |
| | Vegetable extract | 0.4 |
| | Xanthan gum | 0.5 |
| | Sodium glutamate | 0.4 |
| | Concentrated fruit juice | 0.5 |
| | Yeast extract | 0.1 |
| | Water | 23.6 |
| | Total | 100.0 |

In Table 6, as the esterified starch with octenylsuccinic acid, Trecomextwalb 02 (trade name) manufactured by Oji Cornstarch Co., Ltd. (degree of substitution of ester groups is 0.015 and obtained from potato starch as a raw material) was used. As the soybean protein, Sorpie 1500 (trade name) manufactured Nisshin Cosmo Food Co. Ltd. was used. As the hydrogenated starch syrup, SE600 (trade name) manufactured by Nikken Chemicals Co., Ltd. was used. As the xanthan gum, Eco gum GM (trade name) manufactured by Dainippon Pharmaceutical Co., Ltd. was used.

Comparative Example 5

An acidic emulsified mayonnaise-like food containing no thickening polysaccharide was obtained in the same manner as in Example 1 except that the raw materials are used in accordance with the formulation shown in Table 7. The viscosity of the obtained acidic emulsified mayonnaise-like food immediately after manufacturing was 35,000 mPa·s, which was not a satisfactory value. The acidic emulsified mayonnaise-like food obtained in this Comparative Example was thus evaluated by only tests (4) and (5) of the method described above in the paragraph [evaluation method for acidic emulsified mayonnaise-like food]. The results are shown in Table 10. The protein content of the obtained mayonnaise-like food, which was calculated from the contents of the raw materials, was 0% by mass.

TABLE 7

| | Name of raw material | Content (% by mass) |
|---|---|---|
| Oil phase | Rapeseed (The Nisshin OilliO Group, Ltd.) | 57.0 |
| Aqueous phase | Edible vinegar | 7.0 |
| | Spice | 0.1 |
| | Salt | 2.6 |
| | Esterified starch with octenylsuccinic acid | 1.5 |
| | Hydrogenated starch syrup | 6.0 |
| | Vegetable extract | 0.4 |
| | Sodium glutamate | 0.4 |
| | Concentrated fruit juice | 0.5 |
| | Yeast extract | 0.1 |
| | Water | 24.4 |
| | Total | 100.0 |

In Table 7, as the esterified starch with octenylsuccinic acid, Trecomextwalb 02 (trade name) manufactured by Oji Cornstarch Co., Ltd. (degree of substitution of ester groups is 0.015 and obtained from potato starch as a raw material) was used. As the hydrogenated starch syrup, SE600 (trade name) manufactured by Nikken Chemicals Co., Ltd. was used.

TABLE 8

| | | ST | 1 wk | 2 wk | 3 wk |
|---|---|---|---|---|---|
| Example 1 | Viscosity (mPa · s) | 198,800 | 198,100 | 210,000 | 212,100 |
| | Flavor score (40° C. dark place) | 5.0 | 4.8 | 4.4 | 4.3 |
| | Flavor score (20° C. 1000 lx) | 5.0 | 4.8 | 4.6 | 4.5 |
| Example 2 | Viscosity (mPa · s) | 163,000 | 163,000 | 164,000 | 165,000 |
| | Flavor score (40° C. dark place) | 5.0 | 4.8 | 4.6 | 4.4 |
| | Flavor score (20° C. 1000 lx) | 5.0 | 4.8 | 4.7 | 4.5 |
| Comparative Example 1 | Viscosity (mPa · s) | 198,000 | 180,000 | 162,000 | 147,600 |
| | Flavor score (40° C., dark place) | 5.0 | 4.4 | 4.0 | 3.8 |
| | Flavor score (20° C. 1000 lx) | 5.0 | 4.5 | 4.3 | 4.1 |
| Comparative Example 2 | Viscosity (mPa · s) | 188,000 | 180,000 | 175,000 | 170,000 |
| | Flavor score (40° C. dark place) | 5.0 | 4.3 | 4.3 | 4.1 |
| | Flavor score (20° C. 1000 lx) | 5.0 | 4.6 | 4.4 | 4.3 |

TABLE 8-continued

| | | | | | |
|---|---|---|---|---|---|
| Comparative Example 3 | Viscosity (mPa·s) | 215,000 | 212,000 | 210,000 | 205,000 |
| | Flavor score (40° C. dark place) | 5.0 | 4.4 | 4.3 | 4.2 |
| | Flavor score (20° C. 1000 lx) | 5.0 | 4.7 | 4.3 | 4.2 |
| Comparative Example 4 | Viscosity (mPa·s) | 200,000 | 195,000 | 195,000 | 197,000 |
| | Flavor score (40° C., dark place) | 5.0 | 4.4 | 4.3 | 4.2 |
| | Flavor score (20° C., 1000 lx) | 5.0 | 4.6 | 4.5 | 4.1 |

| | | 4 wk | 5 wk | 7 wk |
|---|---|---|---|---|
| Example 1 | Viscosity (mPa·s) | 217,000 | 215,000 | 213,000 |
| | Flavor score (40° C. dark place) | 4.1 | 4.1 | 4.0 |
| | Flavor score (20° C. 1000 lx) | 4.4 | 4.3 | 4.2 |
| Example 2 | Viscosity (mPa·s) | 164,500 | 164,000 | 164,000 |
| | Flavor score (40° C. dark place) | 4.2 | 4.2 | 4.2 |
| | Flavor score (20° C. 1000 lx) | 4.4 | 4.3 | 4.2 |
| Comparative Example 1 | Viscosity (mPa·s) | 135,000 | 129,600 | 126,000 |
| | Flavor score (40° C. dark place) | 3.5 | 3.3 | 3.2 |
| | Flavor score (20° C. 1000 lx) | 3.8 | 3.5 | 3.4 |
| Comparative Example 2 | Viscosity (mPa·s) | 167,000 | 160,000 | 152,000 |
| | Flavor score (40° C. dark place) | 4.0 | 3.9 | 3.6 |
| | Flavor score (20° C. 1000 lx) | 4.1 | 4.0 | 3.7 |
| Comparative Example 3 | Viscosity (mPa·s) | 200,000 | 195,000 | 197,000 |
| | Flavor score (40° C. dark place) | 4.0 | 3.8 | 3.6 |
| | Flavor score (20° C. 1000 lx) | 4.2 | 3.9 | 3.8 |
| Comparative Example 4 | Viscosity (mPa·s) | 195,000 | 190,000 | 188,000 |
| | Flavor score (40° C. dark place) | 3.9 | 3.8 | 3.5 |
| | Flavor score (20° C. 1000 lx) | 4.0 | 3.8 | 3.6 |

TABLE 9

| | Viscosity before test (mPa·s) | Viscosity after test (mPa·s) | Appearance |
|---|---|---|---|
| Example 1 | 198,800 | 218,000 | No separation of oil or water |
| Example 2 | 163,000 | 165,000 | No separation of oil or water |
| Comparative Example 1 | 198,000 | 133,000 | Oil was slightly separated on the upper surface |
| Comparative Example 2 | 188,000 | 150,000 | Oil was slightly separated in the inner wall of the container and water was slightly separated on the upper surface |
| Comparative Example 3 | 215,000 | 195,000 | Oil was slightly separated on the upper surface |
| Comparative Example 4 | 200,000 | 187,000 | Oil was slightly separated in the inner wall of the container and water was slightly separated on the upper surface |

TABLE 10

| | Shape retaining ability | Oral solubility |
|---|---|---|
| Example 1 | G | G |
| Example 2 | G | G |
| Comparative Example 1 | M | P |
| Comparative Example 2 | M | M |
| Comparative Example 3 | M | P |
| Comparative Example 4 | M | M |
| Comparative Example 5 | P | G |

TABLE 11

| | Immediately after manufacturing | 1 month | 2 month | 3 month | 4 month | 5 month | 7 month |
|---|---|---|---|---|---|---|---|
| Example 1 | E | E | E | E | E | G | G |
| Example 2 | E | E | E | E | E | E | E |

The viscosities 7 weeks and immediately after manufacturing and their ratio (7 weeks vs. immediately after manufacturing) are shown in Table 12 from the measurement results of viscosity in Table 8.

TABLE 12

|  | Immediately after manufacturing | 7 weeks later | Ratio of viscosity change |
|---|---|---|---|
| Example 1 | 198,800 | 213,000 | 1.07 |
| Example 2 | 163,000 | 164,000 | 1.01 |
| Comparative Example 1 | 198,000 | 126,000 | 0.64 |
| Comparative Example 2 | 188,000 | 152,000 | 0.81 |
| Comparative Example 3 | 215,000 | 197,000 | 0.92 |
| Comparative Example 4 | 200,000 | 188,000 | 0.94 |

As is apparent from Table 8, the acidic emulsified mayonnaise-like foods obtained in Examples 1 and 2 maintained good flavor after they were stored for 7 weeks, demonstrating that they had good storage stability. In any one of the acidic emulsified mayonnaise-like foods obtained in Comparative Examples 1 to 4, flavor degradation was observed, failing to demonstrate that each of them was an mayonnaise-like food having sufficient storage stability.

As is apparent from Table 12, in the acidic emulsified mayonnaise-like foods obtained in Examples 1 and 2, no decrease in viscosity with time was observed even after they were stored for 7 weeks. In any one of the acidic emulsified mayonnaise like food obtained in Comparative Examples 1 to 4, a decrease in viscosity with time was observed.

As is apparent from Table 9, in the acidic emulsified mayonnaise-like foods obtained in Examples 1 and 2, no change in viscosity and no change in appearance were observed even in the case where a refrigeration-thaw cycle was repeatedly performed. In contrast, in all of the acidic emulsified mayonnaise like food obtained in Comparative Examples 1 to 4, viscosity decreased by repeating the refrigeration-thaw cycle and appearance was not favorable.

As is apparent from Table 10, the acidic emulsified mayonnaise-like foods obtained in Examples 1 and 2 were excellent in shape retaining ability and oral solubility.

As is apparent from Table 11, in the acidic emulsified mayonnaise-like foods obtained in Examples 1 and 2, smooth appearance was maintained. The food obtained in Example 2 exhibited the best results in long-term smooth appearance retaining ability.

Example 3

An acidic emulsified mayonnaise-like food of starch emulsified mayonnaise type was obtained in the same manner as in Example 1 except that the raw materials were used in accordance with the formulation shown in Table 13. The viscosity of the obtained acidic emulsified mayonnaise-like food immediately after manufacturing was 288,000 mPa·s. The protein content of the obtained acidic emulsified mayonnaise-like food, which was calculated from the contents of the raw materials, was 0% by mass. The obtained acidic emulsified mayonnaise-like food was evaluated by the method described in the paragraph [evaluation method for acidic emulsified mayonnaise-like food]. The results are shown in Table 15 (Test (1) and (2)), Table 16 (test (3)), Table 17 (test (4) and (5)), and Table 18 (test (6)).

TABLE 13

|  | Name of raw material | Content (% by mass) |
|---|---|---|
| Oil phase | Rapeseed oil (The Nisshin OilliO Group, Ltd.) | 57.0 |
| Aqueous phase | Edible vinegar | 7.0 |
|  | Spice | 0.1 |
|  | Salt | 2.6 |
|  | Esterified starch 1 with octenylsuccinic acid | 0.8 |
|  | Esterified starch 2 with octenylsuccinic acid | 1.0 |
|  | Hydrogenated starch syrup | 6.0 |
|  | Vegetable extract | 0.4 |
|  | Xanthan gum | 0.5 |
|  | Sodium glutamate | 0.4 |
|  | Concentrated fruit juice | 0.5 |
|  | Yeast extract | 0.1 |
|  | Water | 23.6 |
|  | Total | 100.0 |

In Table 13, as the esterified starch 1 with octenylsuccinic acid, Trecomextwalb 02 (trade name) manufactured by Oji Cornstarch Co., Ltd. (degree of substitution of ester groups is 0.015 and obtained from potato starch as a raw material) was used. As the esterified starch 2 with octenylsuccinic acid, N cleamer 46 (trade name) manufactured by Japan NSC K.K. (degree of substitution of ester groups is 0.020 and obtained from waxy cornstarch as a raw material) was used. As the hydrogenated starch syrup, SE600 (trade name) manufactured by Nikken Chemicals Co., Ltd. was used. As the xanthan gum, Eco gum GM (trade name) manufactured by Dainippon Pharmaceutical Co., Ltd. was used.

Example 4

An acidic emulsified mayonnaise-like food of starch emulsified mayonnaise type was obtained in the same manner as in Example 1 except that the raw materials were used in accordance with the formulation shown in Table 14. The viscosity of the obtained acidic emulsified mayonnaise-like food immediately after manufacturing was 334,000 mPa·s. The protein content of the obtained acidic emulsified mayonnaise-like food, which was calculated from the contents of the raw materials, was 0% by mass. The obtained acidic emulsified mayonnaise-like food was evaluated by the method described in the paragraph [evaluation method for acidic emulsified mayonnaise-like food]. The results are shown in Table 15 (Test (1) and (2)), Table 16 (test (3)), Table 17 (test (4) and (5)), and Table 18 (test (6)).

TABLE 14

|  | Name of raw material | Content (% by mass) |
|---|---|---|
| Oil phase | Rapeseed oil (The Nisshin OilliO Group, Ltd.) | 57.0 |
| Aqueous phase | Edible vinegar | 7.0 |
|  | Spice | 0.1 |
|  | Salt | 2.6 |
|  | Esterified starch 1 with octenylsuccinic acid | 0.8 |
|  | Esterified starch 2 with octenylsuccinic acid | 1.5 |
|  | Hydrogenated starch syrup | 6.0 |
|  | Vegetable extract | 0.4 |
|  | Xanthan gum | 0.6 |

TABLE 14-continued

| Name of raw material | Content (% by mass) |
|---|---|
| Sodium glutamate | 0.4 |
| Concentrated fruit juice | 0.5 |
| Yeast extract | 0.1 |
| Water | 23.0 |
| Total | 100.0 |

In Table 14, as the esterified starch 1 with octenylsuccinic acid, Trecomextwalb 02 (trade name) manufactured by Oji Cornstarch Co., Ltd. (degree of substitution of ester groups is 0.015 and obtained from potato starch as a raw material) was used. As the esterified starch 2 with octenylsuccinic acid, N cleamer 46 (trade name) manufactured by Japan NSC K.K. (degree of substitution of ester groups is 0.020 and obtained from waxy cornstarch as a raw material) was used. As the hydrogenated starch syrup, SE600 (trade name) manufactured by Nikken Chemicals Co., Ltd. was used. As the xanthan gum, Eco gum GM (trade name) manufactured by Dainippon Pharmaceutical Co., Ltd. was used.

TABLE 15

| | | ST | 1 wk | 2 wk | 3 wk |
|---|---|---|---|---|---|
| Example 3 | Viscosity (mPa·s) | 288000 | 288100 | 290000 | 294500 |
| | Flavor score (40° C., dark place) | 5.0 | 4.8 | 4.5 | 4.4 |
| | Flavor score (20° C., 1000 lx) | 5.0 | 4.8 | 4.6 | 4.5 |
| Example 4 | Viscosity (mPa·s) | 334000 | 330100 | 339000 | 339500 |
| | Flavor score (40° C., dark place) | 5.0 | 4.9 | 4.6 | 4.5 |
| | Flavor score (20° C., 1000 lx) | 5.0 | 4.8 | 4.5 | 4.5 |

| | | 4 wk | 5 wk | 7 wk |
|---|---|---|---|---|
| Example 3 | Viscosity (mPa·s) | 297000 | 302300 | 291000 |
| | Flavor score (40° C., dark place) | 4.3 | 4.2 | 4.1 |
| | Flavor score (20° C., 1000 lx) | 4.4 | 4.4 | 4.2 |
| Example 4 | Viscosity (mPa·s) | 337000 | 338400 | 340000 |
| | Flavor score (40° C., dark place) | 4.4 | 4.2 | 4.0 |
| | Flavor score (20° C., 1000 lx) | 4.3 | 4.2 | 4.1 |

TABLE 16

| | Viscosity before test (mPa·s) | Viscosity after test (mPa·s) | Appearance |
|---|---|---|---|
| Example 3 | 288000 | 295000 | No separation of oil and water |
| Example 4 | 334000 | 338000 | No separation of oil and water |

TABLE 17

| | Shape retaining ability | Oral solubility |
|---|---|---|
| Example 3 | G | G |
| Example 4 | G | G |

TABLE 18

| | Immediately after manufacturing | 1 Mon | 2 Mon | 3 Mon | 4 Mon | 5 Mon | 7 Mon |
|---|---|---|---|---|---|---|---|
| Example 3 | E | E | E | E | E | E | E |
| Example 4 | E | E | E | | | | |

Regarding the results of viscosity measurement shown in Table 15, the viscosities at immediately after and 7 weeks after manufacturing and the ratios of changes in viscosity (viscosity at 7 weeks after manufacturing/viscosity at immediately after manufacturing) are shown in Table 19.

TABLE 19

| | Immediately after manufacturing | 7 weeks later | Ratio of viscosity change |
|---|---|---|---|
| Example 3 | 288000 | 291000 | 1.01 |
| Example 4 | 334000 | 340000 | 1.02 |

ADVANTAGE OF THE INVENTION

As described in the forgoing, in an acidic emulsified mayonnaise-like food of the present invention, it is possible to suppress flavor degradation and viscosity reduction with time. Therefore, the mayonnaise-like food is stable in emulsion state and excellent in shape retaining ability.

According to the method of manufacturing an acidic emulsified mayonnaise-like food of the present invention, it is possible to suppress flavor degradation and viscosity reduction with time. Therefore, it is possible to obtain a mayonnaise-like food stable in emulsion state and excellent in shape retaining ability.

We claim:
1. An acidic emulsified mayonnaise-like food comprising:
a) an esterified compound composed of a potato starch or a hydrolysate thereof and an alkenylsuccinic acid;
b) an esterified compound composed waxy cornstarch or a hydrolysate thereof and alkenylsuccinic acid;
c) thickening polysaccharide;
d) an edible fat oil;
e) wherein the content of protein is substantially 0%, and wherein
f) the content of the esterified compounds is 1.0 to 2.5% by mass, and wherein
g) the content of the thickening polysaccharide is 0.3 to 0.7% by mass, and wherein
h) the content of the edible fat and oil is 50 to 70% by mass; and i) wherein the acid emulsified mayonnaise-like food is a semi-solid with a viscosity of 160,000 to 400,000 millipascal-second at 20 degrees Celsius.

2. The acidic emulsified mayonnaise-like food according to claim 1, wherein the acidic emulsified mayonnaise-like food has a viscosity of 160,000 to 340,000 millipascal-second at 20° C.

3. The acidic emulsified mayonnaise-like food according to claim 1, wherein the acidic emulsified mayonnaise-like food has a viscosity of about 180,000 to 300,000 millipascal-second at 20° C.

4. The acidic emulsified mayonnaise-like food according to claim 1, further comprising edible vinegar, salt and seasoning.

5. The acidic emulsified mayonnaise-like food according to claim 1, wherein the mass ratio of the esterified compound to the thickening polysaccharide is from 2:1 to 10:1.

6. The acidic emulsified mayonnaise-like food according to claim 1, wherein the esterified compound has a degree of substitution of ester groups from 0.005 to 0.020.

7. The acidic emulsified mayonnaise-like food according to claim 1, wherein the alkenylsuccinic acid is octenylsuccinic acid.

8. The acidic emulsified mayonnaise-like food according to claim 1, wherein the thickening polysaccharide is xanthum gum.

* * * * *